: 
United States Patent

[111] 3,524,413

| [72] | Inventor | Frank Kenneth Veasman |
| | | Hamburg, New York |
| [21] | Appl. No. | 751,560 |
| [22] | Filed | Aug. 9, 1968 |
| [45] | Patented | Aug. 18, 1970 |
| [73] | Assignee | Buffalo Brake Beam Company |
| | | a Corp. of New York |

[54] CARGO TIE-DOWN ANCHOR
11 Claims, 5 Drawing Figs.

[52] U.S. Cl.................................................. 105/369,
248/361, 280/179, 85/32
[51] Int. Cl................................................... B61d 45/00
[50] Field of Search............................................ 105/369A,
368T; 248/361, 361A; 85/32; 280/179, 179.1

[56] References Cited
UNITED STATES PATENTS

| 2,312,119 | 2/1943 | Nystrom et al. | 105/369 |
| 2,449,049 | 9/1948 | Black | 248/361 |
| 2,756,693 | 7/1956 | Frost | 105/369 |
| 3,233,319 | 2/1956 | Jensen et al. | 105/369 |
| 3,277,844 | 10/1966 | Hakenson | 105/369 |
| 3,381,925 | 5/1968 | Higuchi | 248/361 |

*Primary Examiner*— Drayton E. Hoffman
*Attorney*—Morrison, Kennedy and Campbell

ABSTRACT: The anchor comprises an internally threaded spool shaped anchor nut having a non-circular shaft formed with a spherically shaped base and capped by a flat disk-like top, and a pair of cutout plates in which the anchor nut is mounted for rotation and up and down movement, said plates being attachable to the underside of the vehicle floor around an opening formed therein, and said plates being formed with a bottom spherical surface conforming to the spherically shaped base, whereby the nut when not in use will be permitted to fall down into position to present its disk-like top flush with the vehicle floor.

Patented Aug. 18, 1970
3,524,413
Sheet 1 of 2
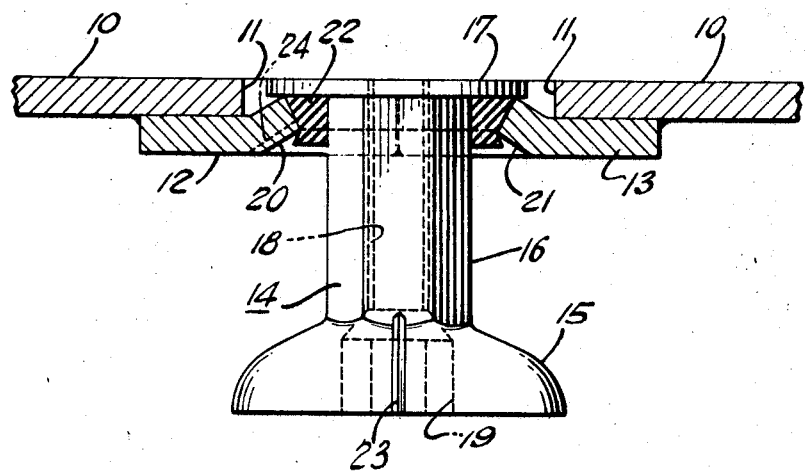
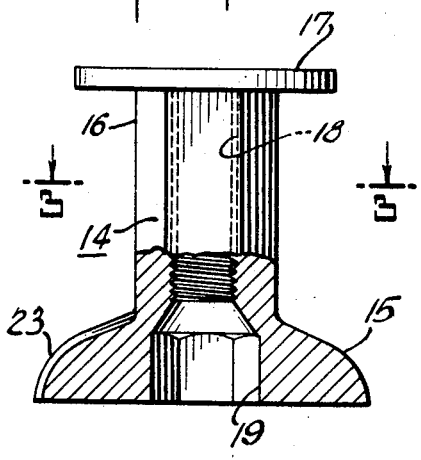
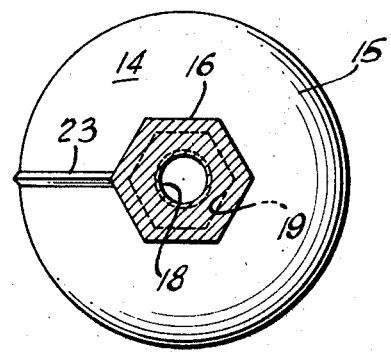
INVENTOR
FRANK K. VEASMAN
BY
Morrison, Kennedy & Campbell
ATTORNEYS.

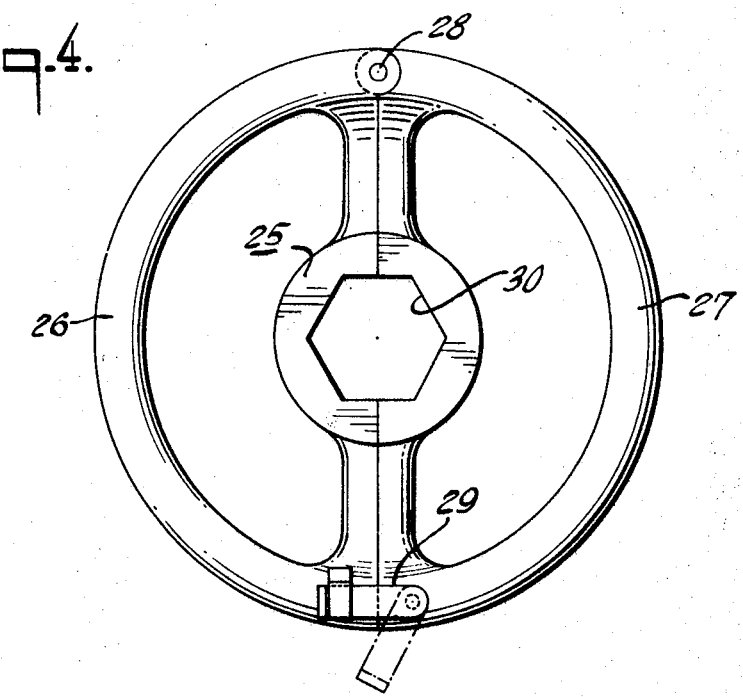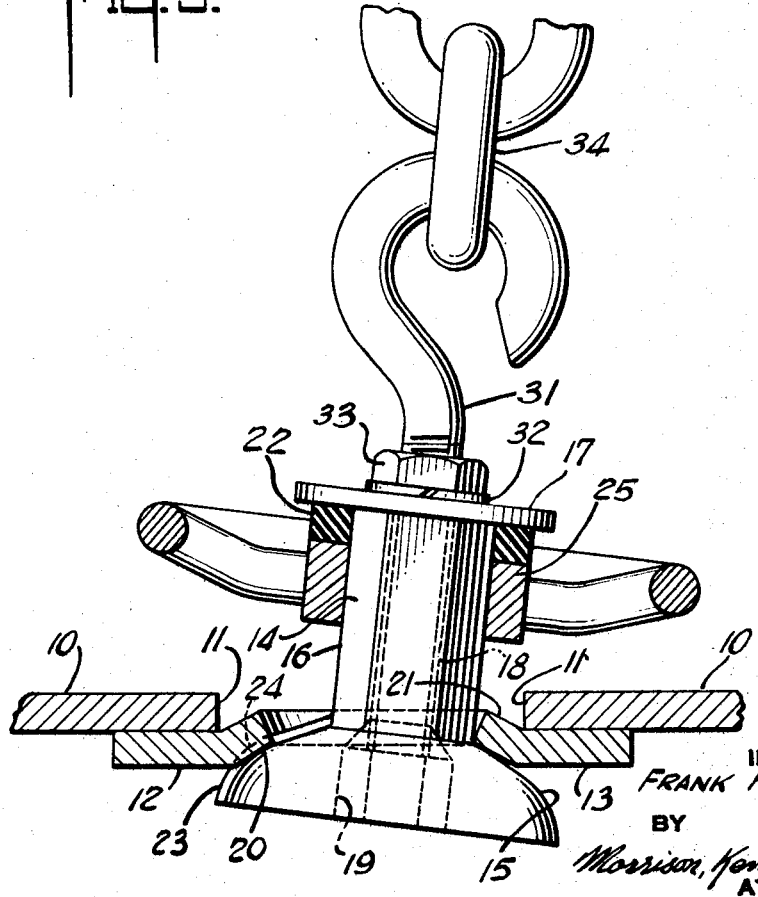

CARGO TIE-DOWN ANCHOR

One feature of the invention is to provide a cargo tie-down anchor which when incorporated in the floor of a vehicle will be flush therewith when not in use and which when in use is capable of angular and circular movement with reference to the vehicle floor in executing its tie-down functions.

A second feature of the invention is to provide a cargo tie-down anchor having a spool shaped anchor nut containing a threaded hole into which any type of hook, eye or ring mounted on a suitably threaded rod may be screwed and tightened by the turning of the anchor nut to anchor the load to the floor of the vehicle. In addition, by providing lock washers and nuts on the threaded rods and radial ribs and slots the tie-down anchors can be locked in place to prevent loosening up during transit.

A third feature of the invention is to provide a cargo tie-down anchor which can readily be mounted in the floor of any vehicle by simply providing a suitable hole (or series of holes where multiple units are desired) in the floor of the vehicle and attaching to the floor around the hole a pair of cut out plates in which the spool shaped anchor nut is mounted, said plates having a bottom spherical surface conforming to the spherically shaped base of the spool shaped anchor nut.

A fourth feature of the invention is to provide turning means for the spool shaped anchor nut by forming it with a non-circular shaft (which preferably is hexagonal) and by forming in the bottom of its spherically shaped base a multi-sided wrench socket so that standard wrenches can be used to turn the anchor nut and so effect rapid tie-downs without having recourse to special tools.

A fifth feature of the invention is to provide an economical tie-down anchor whose parts may be manufactured and installed very economically. The spool shaped anchor nut may be a standard steel casting or forging suitably drilled and tapped, while the cut-out floor plates may be machined, punched or flame cut, then heated and drop forged or cold formed, as desired, to provide a bottom spherical surface conforming to the spherical base of the spool shaped anchor nut. The plates can be quickly welded or riveted in place to the underside of the vehicle floor around an opening provided therein. The tie-down anchors may be installed in any desired pattern in the floor of a vehicle to take care of practically any size and weight of load.

A sixth feature of the invention is to provide a special split wheel which can be placed over the hexagonal shaft and locked in place thereon and thus provide a speedy means for turning and tightening or loosening the tie-down anchors. In addition, the hexagonal wrench socket formed in the bottom of the spherically shaped base forms an additional means for turning the tie-down anchor.

The drawings disclosed herein diagrammatically illustrate by way of example one form of the invention which comprises several novel features hereinafter set forth wherein like reference numerals designate corresponding parts in the several views in which:

FIG. 1 is a partial section through floor of the vehicle and shows the tie-down anchor in the position it occupies when not in use;

FIG. 2 is a side view of the spool shaped anchor nut in detached or unassembled condition;

FIG. 3 is a section taken along the lines of 3-3 of FIG. 2;

FIG. 4 is a top view of the split hand wheel arranged to fit over the hexagonal shaft of the anchor nut; and FIG. 5 is a partial section through the floor of the vehicle similar to FIG. 1 but in this instance showing the spool shaped anchor nut in an operative position with a threaded hook and an attached chain.

Referring to the drawings:

FIG. 1 is a partial section through the floor of the vehicle 10 and shows the hole 11 therein with the pair of cut out plates 12 and 13 welded or riveted thereto with the spool shaped anchor nut 14 mounted therein for rotation and endwise movement, the nut 14 being formed with the spherically shaped base 15 extending radially outwardly from the non-circular shaft 16 which is capped by the flat disk-like top 17 and which has the threaded hole 18 extending downwardly therethrough. The non-circular wrench socket 19 is formed in the bottom of the base 15. The plates 12 and 13 are formed on their bottom sides with spherically shaped surfaces 20 and 21 which will match the spherically shaped base 15 and allow it to be displaced vertically from the center line of the unit in order to allow ties to be made at an angle to the vehicle floor 10. The non-circular shaft 16 is fitted with an elastic collar 22 which will hold the nut 14 flush with the vehicle floor 10 and thus prevent the nut from rattling in the plates 12 and 13 when the vehicle is in motion. Moreover, the design of the anchor nut 14 also helps in that respect since the greater weight is in the spherically shaped base 15. It will be noted that the shaft 16 of the anchor nut 14 as disclosed herein is hexagonal in shape in order to provide means for turning the anchor nut in applying and removing the tie-downs. The wrench socket 19 is also hexagonal in shape for the same reason and is sized to fit standard hexagonally shaped wrenches. The spherical base 15 is also formed with a radially arranged raised rib 23 having a triangular shaped cross section in order that the anchor nut may be turned to tighten the tie-down and also allow for the release thereof. The raised rib 23 being engaged by the V-shaped slot 24 arranged in the spherically shaped surface of the plate 12 upon the tightening of the tie-down to also help prevent the anchor nut 14 from turning after tightening.

FIG. 2 is a detached view of the spool shaped anchor nut 14 and it can readily be seen from this side view that the unit can be produced very economically as a casting or a forging which can then be threaded to produce the threaded hole 18.

FIG. 3, which is a section through the non-circular shaft 16 along the line 3-3 of FIG. 2, clearly shows the spherically shaped base 15 extending radially outwardly therefrom as well as the threaded hole 18 arranged in the center. The hexagonal wrench socket 19 in the bottom of the base 15 is shown by the dotted lines. The radially arranged rib 23 having a triangular shaped cross section is also clearly shown on the spherical base 15.

The split hand wheel 25, shown in plan view in FIG. 4, is formed in two half sections 26 and 27 which are hinged at 28 and locked in place by the latch 29 to form a non-circular opening 30 which will fit the non-circular shaft 16 of the anchor nut 14. The normal shape of the shaft 16 will be hexagonal, so the wheel opening 30 will also be hexagonal to fit around and lock on to the shaft 16 and thus allow the anchor nut to be rapidly turned to either tighten or loosen the tie-down.

FIG. 5 is a partial section through the floor 10 of the vehicle similar to FIG. 1 but in this disclosure the spool shaped anchor nut 14 is up in operative position with a threaded hook 31 in place in the threaded hole 18 and locked in place therein by means of lock washer 32 and lock nut 33 arranged and tightened against the flat disk-like top 17. In addition it will be noted that the raised rib 23 is now engaged by the V-shaped slot 24 to form an additional locking means for the anchor nut 14 to prevent it from turning during transit. It is of extreme importance that the tie-downs stay fast and hold the load in place at all times for if the load starts to shift accidents could well result. If extreme locking is desired the raised rib can be made semi-circular or even square and the slot be contoured to match. It will be noted that the hand wheel 25, partially shown in section, is fitted to the shaft 16 whereby the anchor nut 14 may be held and turned as desired. The hand wheel is not flat but the rim thereof is raised above the center portion to allow it to be gripped when the anchor nut 14 is tilted off-center by the tie-down. The hook 31 is engaged with a link 34 of a chain which in this instance provides the tie-down means for the load on the vehicle floor. It will be noted that the anchor nut 10 as shown in FIG. 5 is not vertical but off to one side to show the possibility of displacement from the vertical center line. It may be further mentioned that where greater angular displacement is desired this can very easily be accomplished by changing the size and shape of the spherically shaped base 15 and the spherical surfaces 20 and 21 conforming thereto in the plates 12 and 13.

It can readily be seen from the foregoing description that a rally simple and inexpensive tie-down had finally been developed, and especially one that will not be noisy when not in use. In addition, a means is also supplied for manipulating the anchor nuts to readily allow the tie-downs to be loosened and tightened in a short period of time without the use of special tools.

As will be evident, the hand wheel 25 is accessible above the vehicle floor while the wrench socket 19 is accessible below the vehicle floor.

I claim:

1. A cargo tie-down anchor, as for incorporation in the floor of a vehicle or the like, comprising, in combination, an internally threaded spool shaped anchor nut having a non-circular shaft formed with a spherically shaped base extending radially outward therefrom and capped by a flat disk-like top, and a pair of cut out plates in which the spool shaped anchor nut is mounted for rotation and endwise movement, said plates being attachable to the underside of the vehicle floor around an opening formed therein, and said plates being formed with a bottom spherical surface conforming to the spherically shaped base of the spool shaped anchor nut, said nut being arranged to drop down through the cut out plates and present its disk-like top flush with the vehicle floor when the nut is out of use.

2. A cargo tie-down anchor according to Claim 1, wherein the spool shaped anchor nut is fitted with an elastic collar under the flat disk-like top.

3. A cargo tie-down anchor according to Claim 1, wherein the non-circular shaft is shaped in the form of a hexagon.

4. A cargo tie-down anchor according to Claim 3, wherein the hexagonal shaft is fitted with a split hand wheel to allow the spool shaped anchor nut to be turned or held steady for fitting threaded anchoring elements thereinto.

5. A cargo tie-down anchor according to Claim 1, wherein the spherically shaped base is formed with a non-circular wrench socket in the bottom thereof.

6. A cargo tie-down anchor according to Claim 5, wherein the wrench socket is multi-sided to accommodate a standard multi-sided stud wrench.

7. A cargo tie-down anchor according to Claim 4, wherein the split hand wheel is used to tighten up the cargo tie-down anchor by turning the spool shaped anchor nut when the latter is in use.

8. A cargo tie-down anchor according to Claim 7, wherein the cargo tie-down anchor may be locked in place by the use of a lock washer and nut suitably arranged on the top of the spool shaped anchor nut.

9. A cargo tie-down anchor according to Claim 8, wherein the cargo tie-down locking means includes a raised rib radially arranged on the spherically shaped base to engage a slot contained in the spherical shaped surface of one of the containing plates.

10. A cargo tie-down anchor according to Claim 4, wherein the split hand wheel is arranged to be locked in place on the hexagonally shaped shaft for manipulation of the anchor nut in tightening up the cargo tie-down anchor.

11. A cargo tie-down anchor according to Claim 1, wherein the spherically shaped base is weighted to hold the anchor nut in place when out of use.